(12) United States Patent
Singh et al.

(10) Patent No.: US 12,361,254 B1
(45) Date of Patent: Jul. 15, 2025

(54) ACTIVATION AND DEACTIVATION DETECTION FOR A PASSIVE WEARABLE METASURFACE USING A SEGMENTED GROUND PLANE

(71) Applicant: Dell Products L.P., Round Rock, TX (US)

(72) Inventors: Tejinder Singh, Manotick (CA); Navjot Kaur Khaira, Manotick (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/780,245

(22) Filed: Jul. 22, 2024

(51) Int. Cl.
| | |
|---|---|
| G06K 19/077 | (2006.01) |
| G06K 19/06 | (2006.01) |
| H01Q 15/00 | (2006.01) |
| H04L 9/40 | (2022.01) |

(52) U.S. Cl.
CPC ... G06K 19/07762 (2013.01); H01Q 15/0086 (2013.01); H04L 63/0876 (2013.01); G06K 2019/0629 (2013.01)

(58) Field of Classification Search
None
See application file for complete search history.

(56) References Cited

U.S. PATENT DOCUMENTS

2007/0091004 A1* 4/2007 Puuri ............... H01Q 13/10 343/718
2020/0005113 A1* 1/2020 Schnippering ... G06K 19/07777

OTHER PUBLICATIONS

Singh, et al. "Passive Wearable Device for Security and Authentication" U.S. Appl. No. 18/775,968, filed Jul. 17, 2024, 39 pages.
Singh, et al. "Scalable and Compact Metasurface Design for Smart and Functional Wearable Devices" U.S. Appl. No. 18/775,979, filed Jul. 17, 2024, 39 pages.
Singh, et al. "Integrated Physical Device Identification for Remote Management of Wearable Metasurfaces" U.S. Appl. No. 18/775,984, filed Jul. 17, 2024, 41 pages.

(Continued)

*Primary Examiner* — Kristy A Haupt
(74) *Attorney, Agent, or Firm* — Amin, Turocy & Watson, LLP

(57) ABSTRACT

The technology described herein is directed towards a wearable device that includes a passive metasurface of unit cells with a segmented ground plane of electrically separated segments. When the wearable device is worn, e.g., as a ring or wristband that contacts the wearer's skin, the wearer's skin conductivity electrically connects the separated segments to provide a ground plane. With a complete ground plane, the metasurface's unit cells resonate when exposed to a transmitted signal and reflect a distinct signature corresponding to a physical radiation pattern of signals reflected by the activated metasurface. When not worn, the metasurface is deactivated because of the electrically disconnected ground plane segments. Thus, when a transceiver transmits a wireless radio frequency signal towards an activated metasurface, the radiation pattern of the reflected signal is distinct per metasurface, providing a signature of that particular metasurface, which can be used for proximity detection and/or authentication, for example.

20 Claims, 13 Drawing Sheets

(56) References Cited

OTHER PUBLICATIONS

Singh, et al. "Differentiating Physical Radiation Patterns in Passive Metasurfaces" U.S. Appl. No. 18/775,993, filed Jul. 17, 2024, 40 pages.
Singh, et al. "Customization and Appearance Information for Wearable Metasurfaces" U.S. Appl. No. 18/775,999, filed Jul. 17, 2024, 41 pages.
Singh, et al. "Computer Peripheral With Embedded Transceiver for Proximity Detection of Wearable Metasurfaces" U.S. Appl. No. 18/776,001, filed Jul. 17, 2024, 40 pages.
Singh, et al. "Proximity Based Multifactor Authentication Using Passive Wearable Metasurfaces" U.S. Appl. No. 18/776,007, filed Jul. 17, 2024, 46 pages.
Singh, et al. "Automatic Computing Device Wake up and Lock Using Passive Wearable Metasurface" U.S. Appl. No. 18/776,011, filed Jul. 17, 2024, 45 pages.
Singh, et al. "Software Stack and Backend for Passive Wearable Metasurfaces for Remote Management and Analytics" U.S. Appl. No. 18/776,018, filed Jul. 17, 2024, 50 pages.
Singh, et al. "Design and Deployment of a Wearable Metasurface With a Segmented Ground Plane" U.S. Appl. No. 18/780,263, filed Jul. 22, 2024, 39 pages.
Singh, et al. "Compact Transceiver With Advanced Beam-Scanning Functionality Based on Leaky Wave Antenna" U.S. Appl. No. 18/780,280, filed Jul. 22, 2024, 37 pages.
Singh, et al. "Aperture Reconfiguration for Transceiver With Beam-Scanning Capability" U.S. Appl. No. 18/780,284, filed Jul. 22, 2024, 37 pages.

\* cited by examiner

FIG. 13 begin
↓

1302 — DETECTING, BY A SYSTEM COMPRISING AT LEAST ONE PROCESSOR, A PROXIMITY OF A USER TO A COMPUTING DEVICE THAT COMPRISES OR IS COUPLED TO A RECEIVER; THE DETECTING CAN INCLUDE:

1304 — RECEIVING A WIRELESS RADIO FREQUENCY SIGNAL AT THE RECEIVER

1306 — DETERMINING THAT RECEIVED RADIATION PATTERN DATA REPRESENTATIVE OF A RECEIVED RADIATION PATTERN ASSOCIATED WITH THE WIRELESS RADIO FREQUENCY SIGNAL MATCHES EXPECTED RADIATION PATTERN DATA REPRESENTATIVE OF AN EXPECTED RADIATION PATTERN ASSOCIATED WITH A WEARABLE METASURFACE ASSOCIATED WITH THE USER, THE WEARABLE METASURFACE COMPRISING A SEGMENTED GROUND PLANE OF SEPARATED METALLIC SEGMENTS, IN WHICH THE WEARABLE METASURFACE REFLECTS A TRANSMITTED SIGNAL TO THE RECEIVER BASED ON THE SEGMENTED GROUND PLANE BEING A COMPLETED GROUND PLANE AS A RESULT OF A SKIN CONDUCTIVITY OF THE USER WEARING THE WEARABLE METASURFACE ELECTRICALLY COUPLING THE SEPARATED METALLIC SEGMENTS TO ONE ANOTHER

↓

1308 — IN RESPONSE TO THE DETERMINING THAT THE RECEIVED RADIATION PATTERN DATA MATCHES THE EXPECTED RADIATION PATTERN DATA, DETERMINING, BY THE SYSTEM, THAT THE USER ASSOCIATED WITH THE WEARABLE METASURFACE IS WITHIN A SPECIFIED PROXIMITY DISTANCE OF THE COMPUTING DEVICE

↓

1310 — TAKING ACTION, BY THE SYSTEM, BASED ON THE USER ASSOCIATED WITH THE WEARABLE METASURFACE BEING DETERMINED TO BE WITHIN THE SPECIFIED PROXIMITY DISTANCE OF THE COMPUTING DEVICE

↓
end

ACTIVATION AND DEACTIVATION DETECTION FOR A PASSIVE WEARABLE METASURFACE USING A SEGMENTED GROUND PLANE

BACKGROUND

Existing wearable devices such as rings and wristwatches for activity tracking and/or health monitoring operate by establishing a communication link between the wearable device and a transceiver, generally using BLUETOOTH low energy technology. As such, these devices need electrical components such as a battery, various sensors, circuits, a controller, and antennas within the device, increasing the cost, size, and complexity in design. Moreover, due to the smaller battery size, these wearable devices need to be charged frequently.

BRIEF DESCRIPTION OF THE DRAWINGS

The technology described herein is illustrated by way of example and not limited in the accompanying figures in which like reference numerals indicate similar elements and in which:

FIG. 13 is a flow diagram showing example operations related to detecting a user based on determining that a received radiation pattern associated with a wearable metasurface, which has a segmented ground plane, matches expected radiation pattern data as a result of a skin conductivity of the user wearing the wearable metasurface completing the ground plane, in accordance with various example embodiments and implementations of the subject disclosure.

DETAILED DESCRIPTION

Figures 1A, 1B:
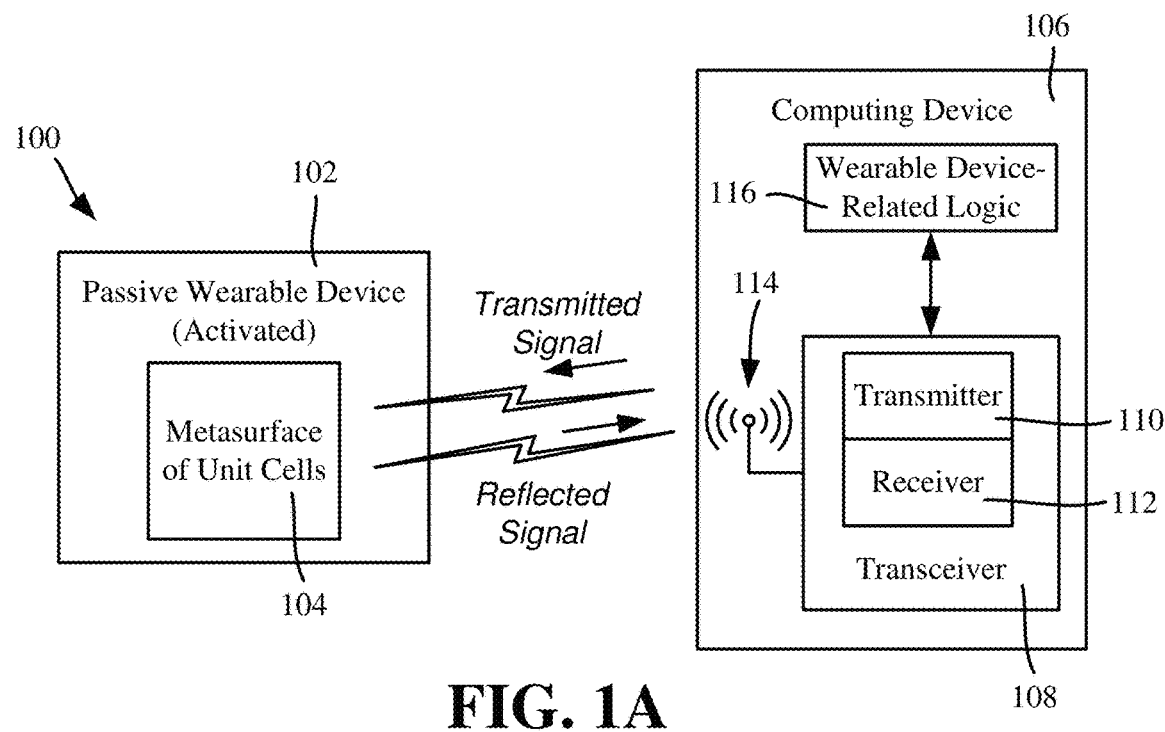
FIG. 1A is a block diagram representation of an example wearable device including an activated, passive metasurface communicating with a computing device via an embedded transceiver, in accordance with various example embodiments and implementations of the subject disclosure.
FIG. 1B is a block diagram representation of an example wearable device including an activated, passive metasurface communicating with a computing device via an external transceiver, in accordance with various example embodiments and implementations of the subject disclosure.

The technology described herein is generally directed towards a wearable or otherwise portable metasurface that is capable of interacting with a receiver connected to a computing device, such as a personal computer or laptop. The metasurface, which can be passive in that it needs no power, includes unit cells that are distinctly identifiable based on customized physical radiation characteristics relative to other metasurfaces when reflecting a transmitted signal back to a receiver, e.g., of a transceiver that transmits the signal.

As will be understood, the wearable metasurface includes a segmented ground plane of separated segments that results in activation or deactivation depending on whether the separated segments are electrically connected to one another or not connected. Generally, activation results from skin conductivity electrically connecting the separated segments, such that the wearable metasurface is activated when worn by a user, e.g., on a finger as a ring or on a wrist as a wristband, and deactivated when not worn. That is, the skin conductivity when worn completes the ground plane so that when a signal is transmitted at the designed operating frequency by a transmitter to the metasurface, the unit cells resonate and thereby reflect the signal, as altered by the metasurface, back to a receiver, which results in the presence of the metasurface being detected.

If the user is not wearing the wearable device, there is no ground plane, and no signal is reflected as the unit cells do not resonate, thereby deactivating the device. As such, the transceiver searching function (e.g., controlled by a computing device) can be disabled (or its period between searches increased), along with the background applet to save power and compute. In this way, unlike other devices that use a proximity sensor to detect if the device is worn by a user or not, power is not needed except when searching (and even then, the device itself needs no power); note that proximity sensors in other types of devices require power, unlike the technology described herein which provides a passive method to detect if the wearable device is being worn.

Thus, the passive metasurface is used to detect the radiation pattern, yet only works if there is a continuous ground plane (metallic plane) underneath the unit cells. The segregated ground plane segments create discontinuity, such that the ground plane becomes conducting whenever the user wears the device because of the user's skin conductivity. The segmented ground plane thus facilitates device activation and deactivation as part of a passive structure that enables and disables the wearable devices. When the wearable device is not in use, the discontinuities within the ground plane serve as a barrier, effectively disabling the device's ability to radiate and detect proximity. However, when the device is worn by the user, the discontinuities in the ground plane are seamlessly bridged by skin conductivity, triggering the activation of the device.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in RF communications and RF devices in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1A is a block diagram representation of one example implementation of a system 100 in which a wearable device 102, which includes a metasurface of unit cells 104 (including a segmented ground plane as described herein), communicates with a computing device 106. In the example of FIG. 1A, the computing device 106 includes an embedded, integrated or otherwise internal transceiver 108, which in turn includes a transmitter 110 and receiver 112. The transceiver components are coupled to an antenna 114 that transmits signals to the metasurface 104 of the passive wearable device 102, which as described herein, alters a reflected instance of the signal's characteristics to the transceiver's receiver 112, when the metasurface is activated (e.g., as a result of being worn as described herein). Based on the received signal, wearable device-related logic 116 (e.g., a hardware or software program running in the computing device 106) can analyze the reflected signal and take some action based thereon as described herein, such as to wake the operating system program or the like for execution in the computing device.

Thus, in one implementation, the receiver is part of a dedicated transceiver that can be embedded into or otherwise coupled to the computing device. The transceiver, serving as the system's active component, emits a wireless radio frequency signal towards a metasurface integrated into the wearable device. Upon receiving the signal, the metasurface, when activated, alters the incoming signal's properties in a predefined manner, based on the distinctly identifiable unit cells that alter the physical radiation pattern, and redirects (reflects) the altered instance of the signal back to the transceiver.

Each activated metasurface thus generates a distinct radiation pattern, which not only differentiates each metasurface from others but also ensures that each metasurface can uniquely interact with a corresponding system. The distinct radiation pattern can correspond to a service tag encoding for individual metasurface identification, which can include information such as appearance, materials, location, antenna patterns, beam splitting nature, range, and the like.

The distinct radiation pattern facilitates remote management of the metasurface. For example, consider that a metasurface is to be used to access a computing system and/or account thereon by interacting with the system's transceiver. When new, the metasurface can be activated with respect to accessing that computing system/account by receipt of its reflected signal. If lost, the metasurface can be deactivated (e.g., suspended or permanently deactivated) with respect to the associated device(s), system(s) and/or account(s). A remote system can handle the activation/deactivation, such as based on identification and credentials provided by a user when needed. When active, the metasurface can be used with the transceiver for detecting the proximity of the user, as well as possibly other actions such as authenticating the user, providing a seamless and intuitive user experience that is both efficient and secure. For example, the computing device can wake up or lock based on the presence or absence of the authenticated user, respectively.

The wearable device embedded with a metasurface or with a metasurface affixed thereto, can become a component in a user's daily attire, for example. Significantly, the wearable device and metasurface can be passive, requiring no internal or external power source to operate as a reflecting device.

FIG. 1B is similar to FIG. 1A, except that a transceiver 109 (transmitter Tx 111/receiver Rx 113) is external to the computing device 107. For example, the external transceiver 109 can be designed as a universal serial bus (USB) device or other suitable device that plugs into a port of the computing device 109. Alternatively, the external transceiver 109 can be embedded into a computer peripheral, such as a mouse, keyboard or monitor.

While a dedicated transceiver is one practical and convenient example, it should be noted that the transmitter and the receiver can be separate components. For example, consider an office setting where a single wall-mounted transmitter can transmit signals to multiple user work locations. Each user can share the same transmitter, yet have his or her own passive wearable device that reflects from the transmitter to a receiver. The users' respective computing devices can have respective external or internal receivers.

Figure 2:
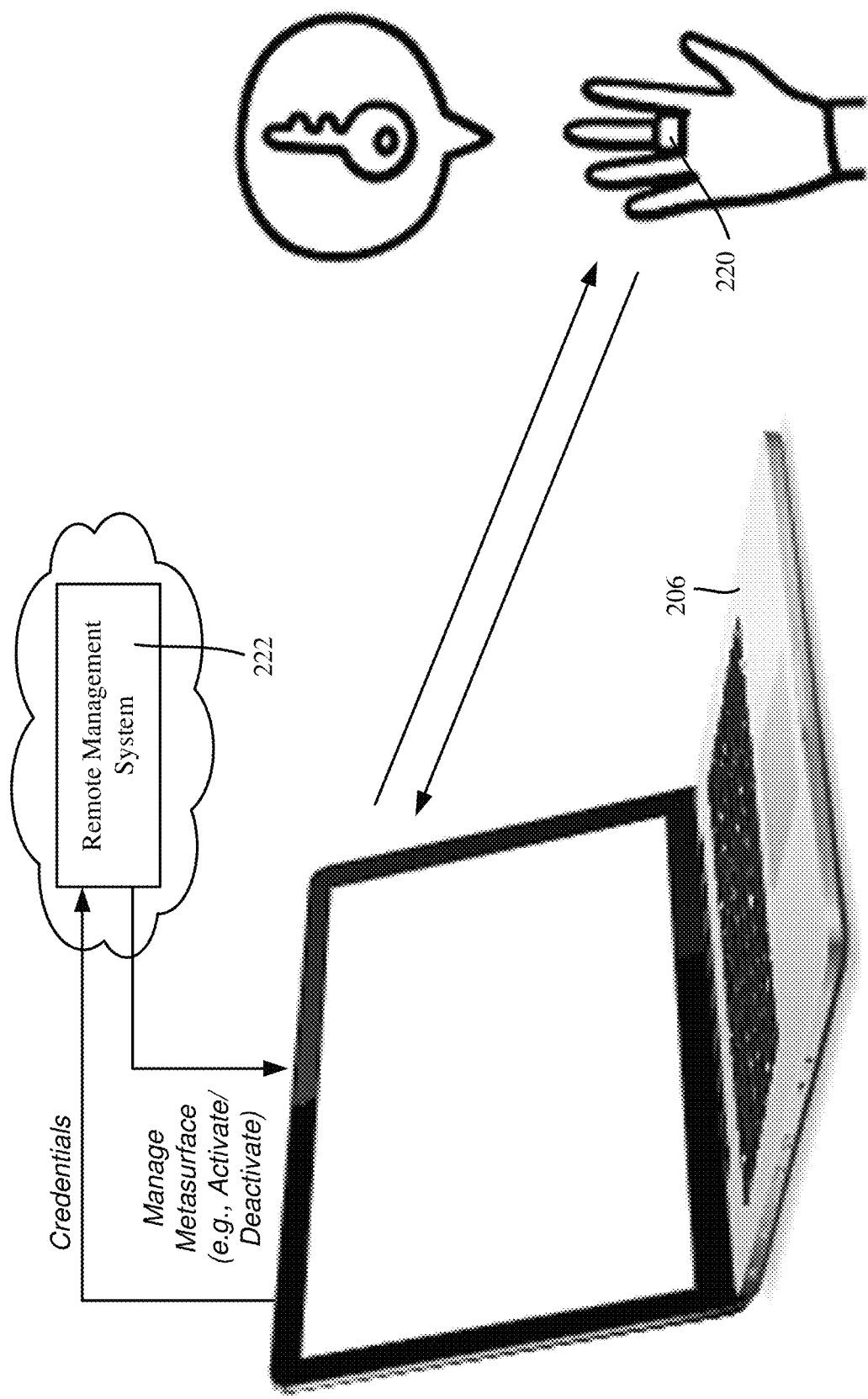
FIG. 2 is a representation of an example wearable device in the form of a ring design, in which the wearable device includes an activated, passive metasurface that acts as a security/authentication key with respect to a computing device, in accordance with various example embodiments and implementations of the subject disclosure.
Figure 3:
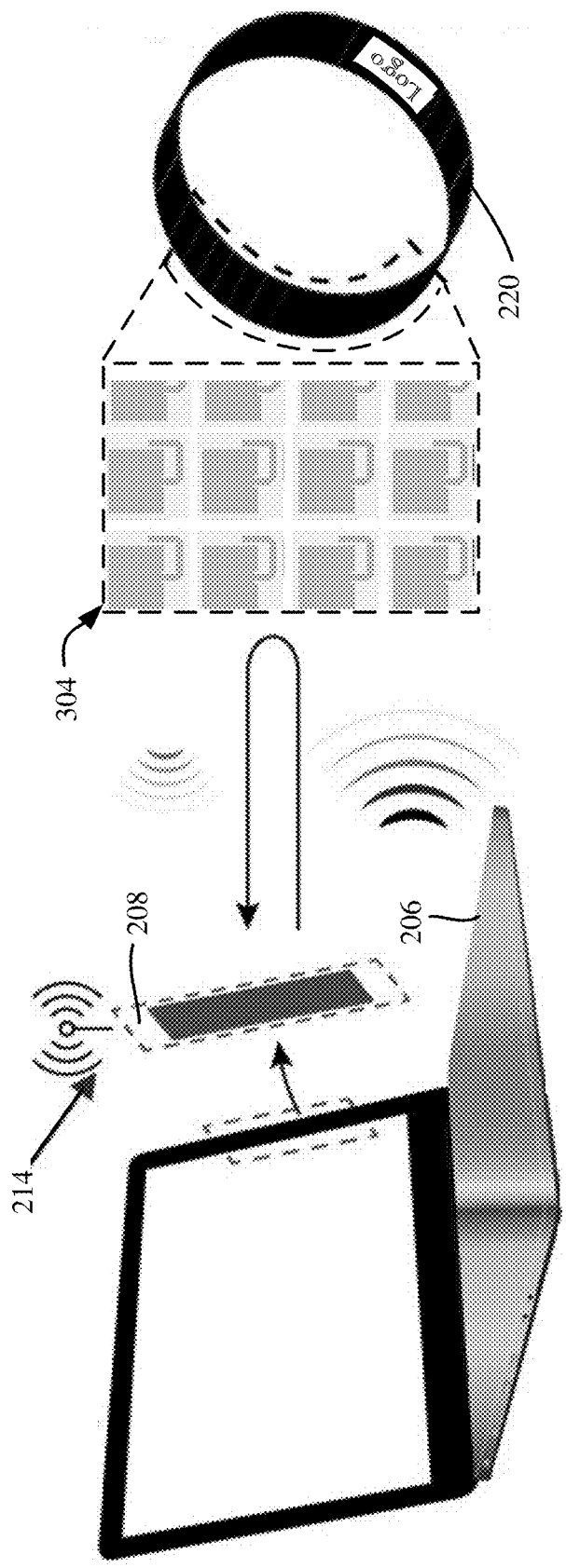
FIG. 3 is a representation of an example wearable device in the form of a ring design, highlighting the activated, passive metasurface communicating with a transceiver embedded in a computing device, in accordance with various example embodiments and implementations of the subject disclosure.

FIGS. 2 and 3 show the general concept of a ring-based wearable metasurface 220 interacting with a laptop computer 206. The ring-based wearable metasurface 220 can act as a key to lock and unlock the computer 206, for example, or at least detect the user's presence to wake the computer 206, such as to automatically open present an interactive lock screen when proximity is detected.

Initially, the ring-based wearable metasurface 220 may need to be initially activated or reactivated with respect to the particular device 206, and/or an account, such as an account that is accessed via the device 206. To this end, a user or administrator sends credentials to a remote management system 222 that ensures that the metasurface 220 has not previously been permanently deactivated, and if not, informs the device 206 (or an account) that the metasurface 220 is now active for interacting with the device. Note that once activated, the remote management system need not be accessed further with respect to the particular device 206, as the signals reflected by the metasurface 220 now have a distinctly recognizable signature that allows access to the device. The distinct radiation pattern (signature/service tag) of the ring-based wearable metasurface 220 thus serves as an access key.

The remote management system maintains an association between the metasurface signature (e.g., service tag) and the credentials. In the event that the metasurface 220 is misplaced, lost or otherwise needs to be disabled (e.g., a former employee has a company-owned ring), the metasurface 220 can be deactivated through the maintained credentials. Deactivation can be permanent, or can be temporary, e.g., the metasurface 220 can be suspended with respect to the device 206/account, and reactivated via the credentials if found or transferred to another user or another device. Information about the device 206 also can be maintained by the remote management system 222. For example, the remote management system 222 can maintain statistics or other data as to metasurface-to-device access patterns, usage, and so forth, e.g., for analysis by the metasurface's owner.

In the example of FIG. 3, a portion of the metasurface unit cells 304 is shown enlarged and interacting with a transceiver 208 (via antenna 214) integrated into the bezel or the like of the computer 206. In general, the user only needs to orient his or her hand at a reasonably close and suitable reflecting angle for the system to operate. Instead of the bezel, the transceiver 208 (or the antenna 214 coupled thereto) can be embedded into the lower portion of the laptop so that when interacting with the keyboard/mouse pad, the user's ring is naturally angled downward in a direction generally towards the antenna.

Figure 4:
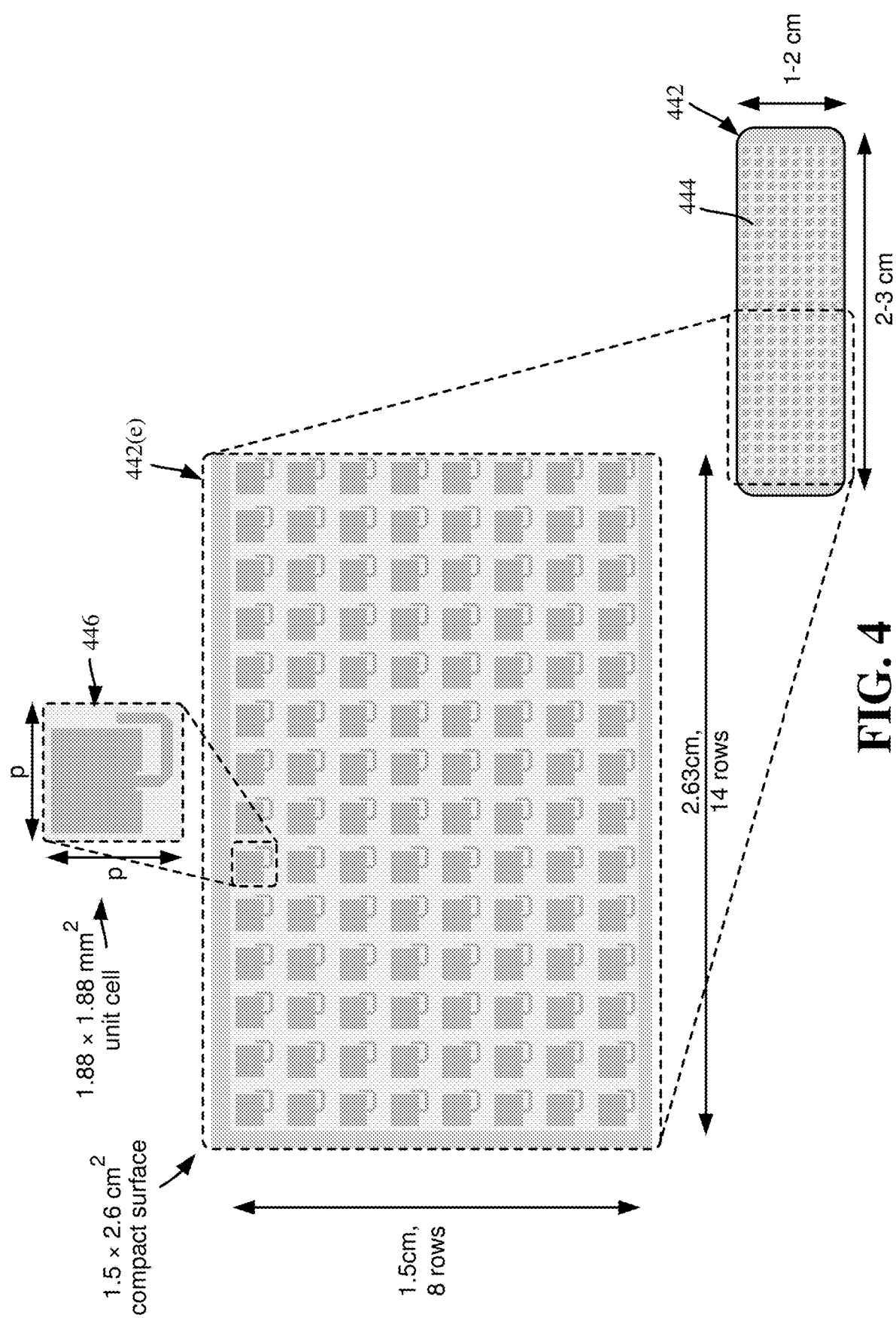
FIG. 4 is a representation of an example surface designed for being implemented at 80 GHz, demonstrating the metasurface's compact and planar features, along with an enlarged portion representation thereof, and an enlarged unit cell representation, in accordance with various example embodiments and implementations of the subject disclosure.

FIG. 4 shows an example wearable device 442 that incorporates a metasurface 444 with an 8×28 array of unit cells. An enlarged portion 442 (e) highlighting an 8×14 unit cell array of the metasurface 444 is shown, and one of the unit cells 446 is enlarged.

In one example implementation, the metasurface is fabricated on flexible material (substrate and metallic ground plane) to facilitate forming the wearable device into a ring shape suitable for wearing on a human finger. The dimensions shown in FIG. 4 are based on a typical adult finger size and a frequency of 80 gigahertz (GHz). The fabrication tolerance of the metasurface design described herein makes this design easily scalable up to sub-terahertz frequencies, which is suitable for miniaturization to fit on a ring. As shown in FIG. 4, each unit cell in this example measures 1.88 mm×1.88 mm. These unit cells can be arranged in a matrix to fit within a ring that measures 1.5 cm in width and 2 to 3 cm in length when flattened. Additionally, the design is conformal, allowing for adjustments to accommodate bending of the surface, ensuring both flexibility and functionality in wearable applications.

Figure 5A:
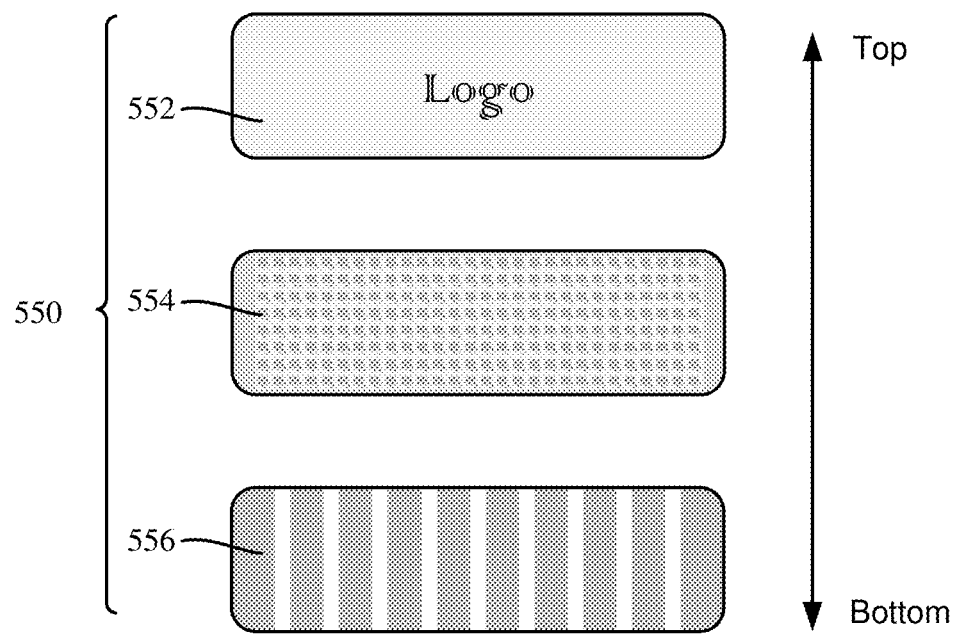
FIG. 5A is a top-down deconstructed representation of an example wearable device in the form of a ring (or similarly a wristband) design with a segmented ground plane, in accordance with various example embodiments and implementations of the subject disclosure.

FIG. 5A shows the concept of a metasurface 550 with a segmented ground plane. From top down in a deconstructed view, the metasurface 550 includes a mask layer 552 or the like that determines the appearance of the outside of the metasurface 550, a next layer including the unit cells of the metasurface 554 (on a substrate), and the segmented ground plane 556 beneath the substrate. The mask layer 552, e.g., made of a suitable material that is generally transparent to the operating frequency of the metasurface's unit cells, also protects the unit cells from dirt, wear and tear (dings) and the like.

As shown in FIG. 5A, the segmented ground plane 556 is made of separated metallic segments, which are electrically insulated from one another when the device 550 is in a deactivated state. As a result, until the device is worn (or the separated segments are otherwise electrically coupled to one another), the device will not reflect the transmitted signal. This corresponds to the "OFF" (deactivated) state 560 of the conceptual "switch" shown in FIG. 5B.

Figure 5B:
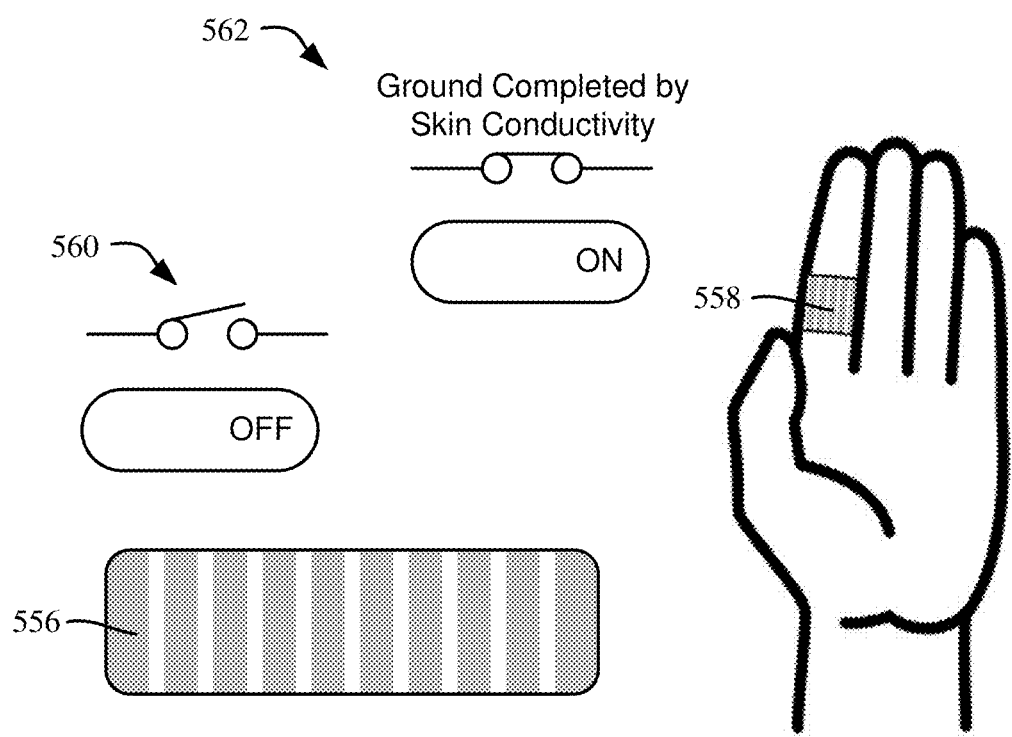
FIG. 5B is a representation of an example wearable device in the form of a ring design highlighting a segmented ground plane (normally not visible when worn), in accordance with various example embodiments and implementations of the subject disclosure.
Figure 6A:
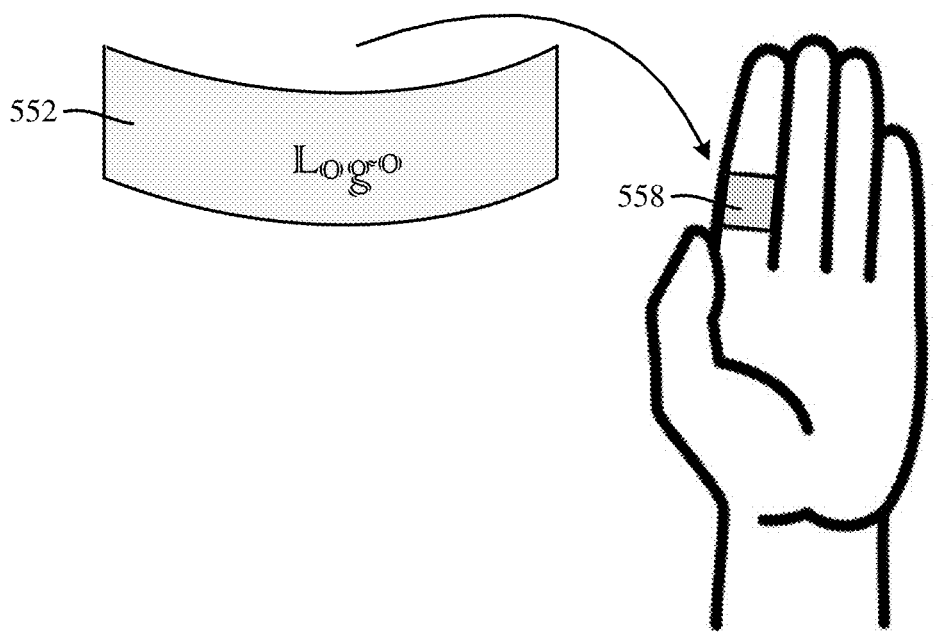
FIG. 6A is a representation of an example wearable device in the form of a ring design in which a mask that covers the metasurface is visible, in accordance with various example embodiments and implementations of the subject disclosure.

FIG. 5B shows the operating concept of the segmented ground plane 556; note that in this example for purposes of explanation the segments of the segmented ground plane are visible (as if the metasurface unit cells, substrate and mask were visibly transparent, which is not visibly accurate when the wearable device is properly deployed and worn; instead, as shown in FIG. 6A the mask 552 is actually visible when worn as a ring 558). When the wearable device is worn, e.g., as the finger ring 558 in FIG. 5B, the skin conductivity of the user electrically couples the metallic segments together and thereby completes the ground plane. This corresponds to the "ON" (activated) state 562 of the conceptual "switch" shown in FIG. 5B. As a result, when the device 550 is worn, the otherwise separated segments are electrically coupled to one another by the user's skin conductivity, the unit cells will resonate at the operating frequency, and the device will reflect the transmitted signal to the transceiver's receiver.

Figure 6B:
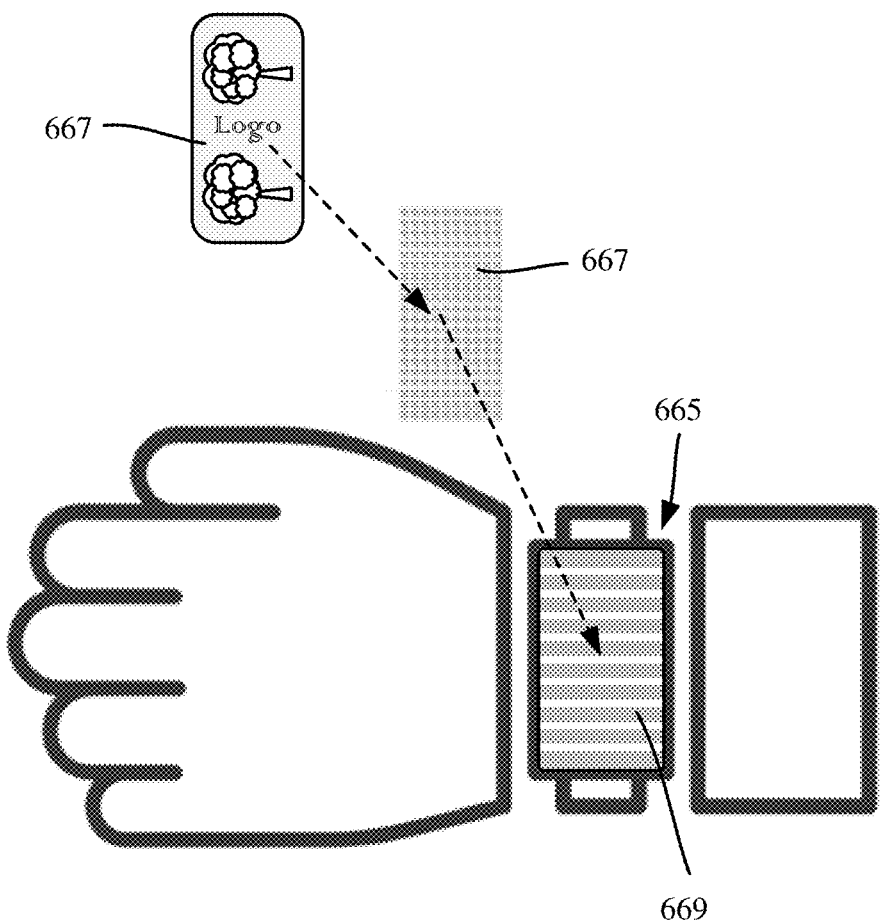
FIG. 6B is a deconstructed representation of an example wearable device with a passive metasurface in the form of a wrist-wearable (e.g., wristband or bracelet) design, in accordance with various example embodiments and implementations of the subject disclosure.

FIG. 6B shows an alternative, non-limiting example of a wearable device, namely designed as a wrist-worn (e.g., wristband or bracelet) device 665. A mask layer 667 and unit cells/metasurface layer 668 are shown separately from the segmented ground plane layer 669 in FIG. 6B for purposes of explanation, but in general are worn as a single-unit wearable device (although detachable/interchangeable masks are feasible). Note that while the metasurface itself is passive, the metasurface can be coupled to a non-passive device, e.g., a watchband of a user's existing battery-powered wristwatch. Some example consideration factors when choosing among the wearable metasurface devices are summarized in the following table:

| User Needs | Product |
|---|---|
| Tranceiver Alignment | Ring |
| Gain | Wrist-worn Device |

Figure 7A:
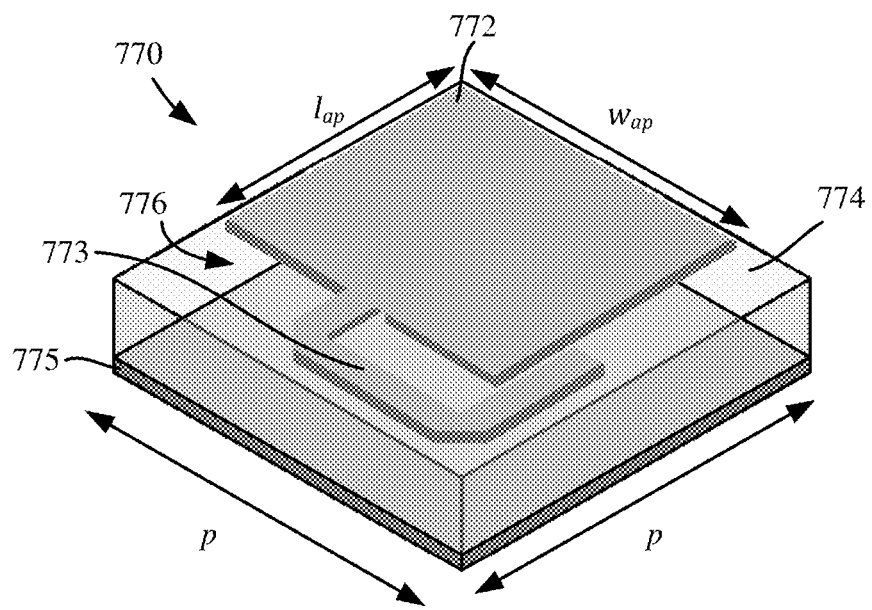
FIG. 7A is a three-dimensional perspective view representation of an example unit cell for a metasurface of a passive wearable device, in accordance with various example embodiments and implementations of the subject disclosure.

FIG. 7A shows a three-dimensional perspective view of one metasurface design 770 that includes a metallic patch element 772 and a metallic phase delay element 773. The metallic patch element 772 and the metallic phase delay element 773 are fabricated atop a substrate 774; a ground plane layer (panel) 775 is segmented as described herein. The segmented ground plane layer 775 is beneath the substrate 774, and, in conjunction with the metallic patch element 772 provides an aperture 776 of length $l_{ap}$ and width $W_{ap}$ that facilitates passive operation of the unit cell 770, when the separated segments become electrically coupled to one another. As is understood, an entire array of unit cells can be fabricated on a single substrate/ground plane.

Figure 7B:
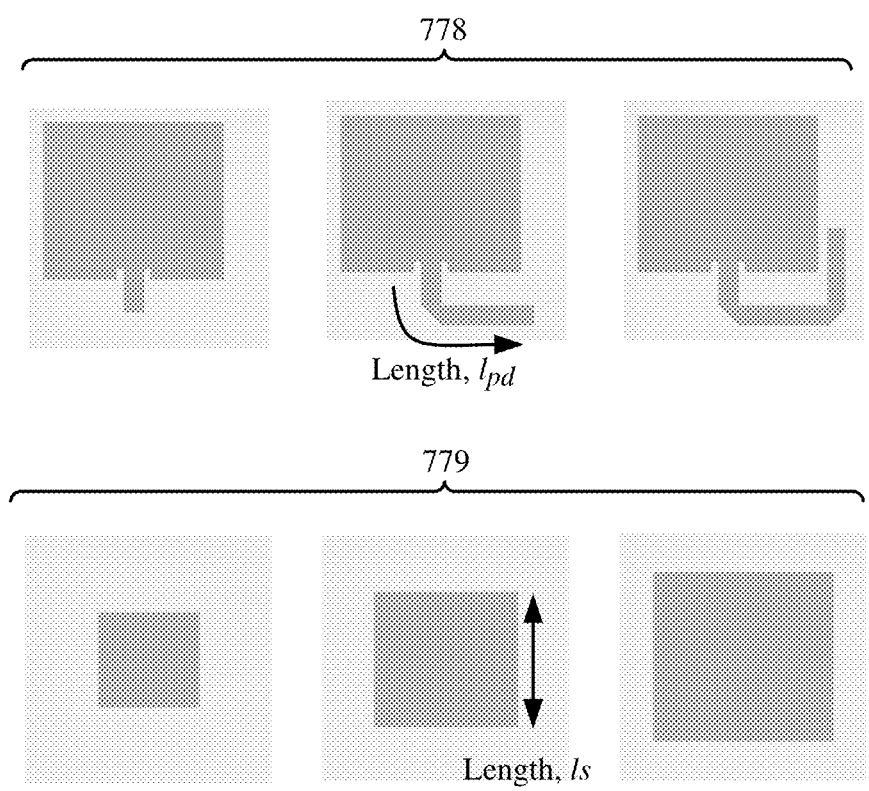
FIG. 7B is a representation of an example unit cell designs with geometry variations for different phase profiles, in accordance with various example embodiments and implementations of the subject disclosure.

The length of the phase delay element 773 (i.e., metallic stub) adjusts the phase of the reflected signal. Such a phase delay element-based designs (778, FIG. 7B) overcome several challenges that regular variable-patch size approaches (779, FIG. 7B) encounter, as demonstrated by the simulation results shown in FIGS. 8 and 9. The simulation shows a full-wave numerical experiment result for an example unit-cell design using line-delay elements, which demonstrates phase delay element-based phase linearity compared to conventional size variation. The design was originally designed for 30 GHz, with $l_{ap}$=2.93 mm, $W_{ap}$=3.31 mm, and p=5.01 mm.

Figure 8:
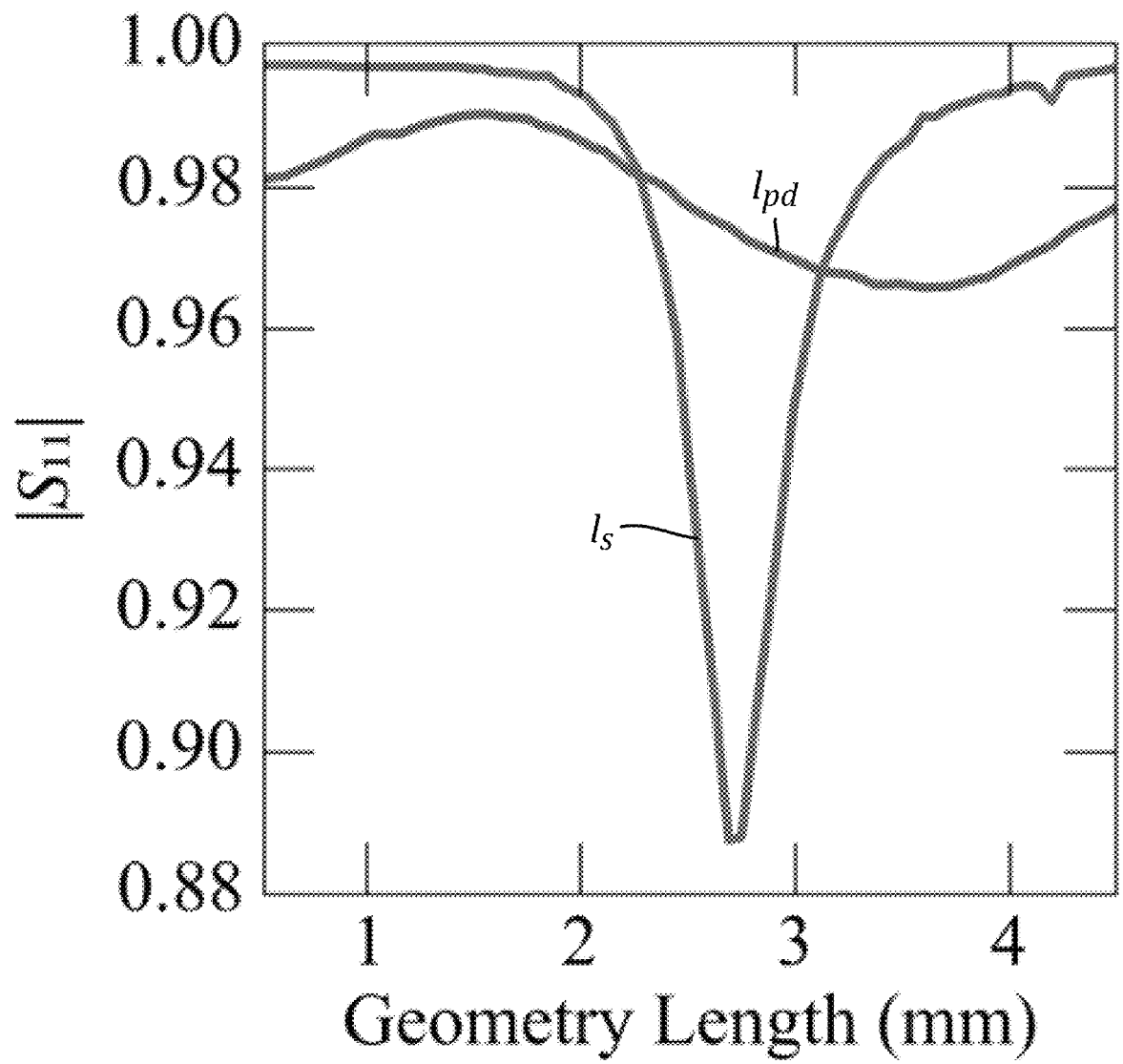
FIG. 8 is a graphical representation of geometry length versus signal reflection for example passive metasurface device designs, in accordance with various example embodiments and implementations of the subject disclosure.
Figure 9:
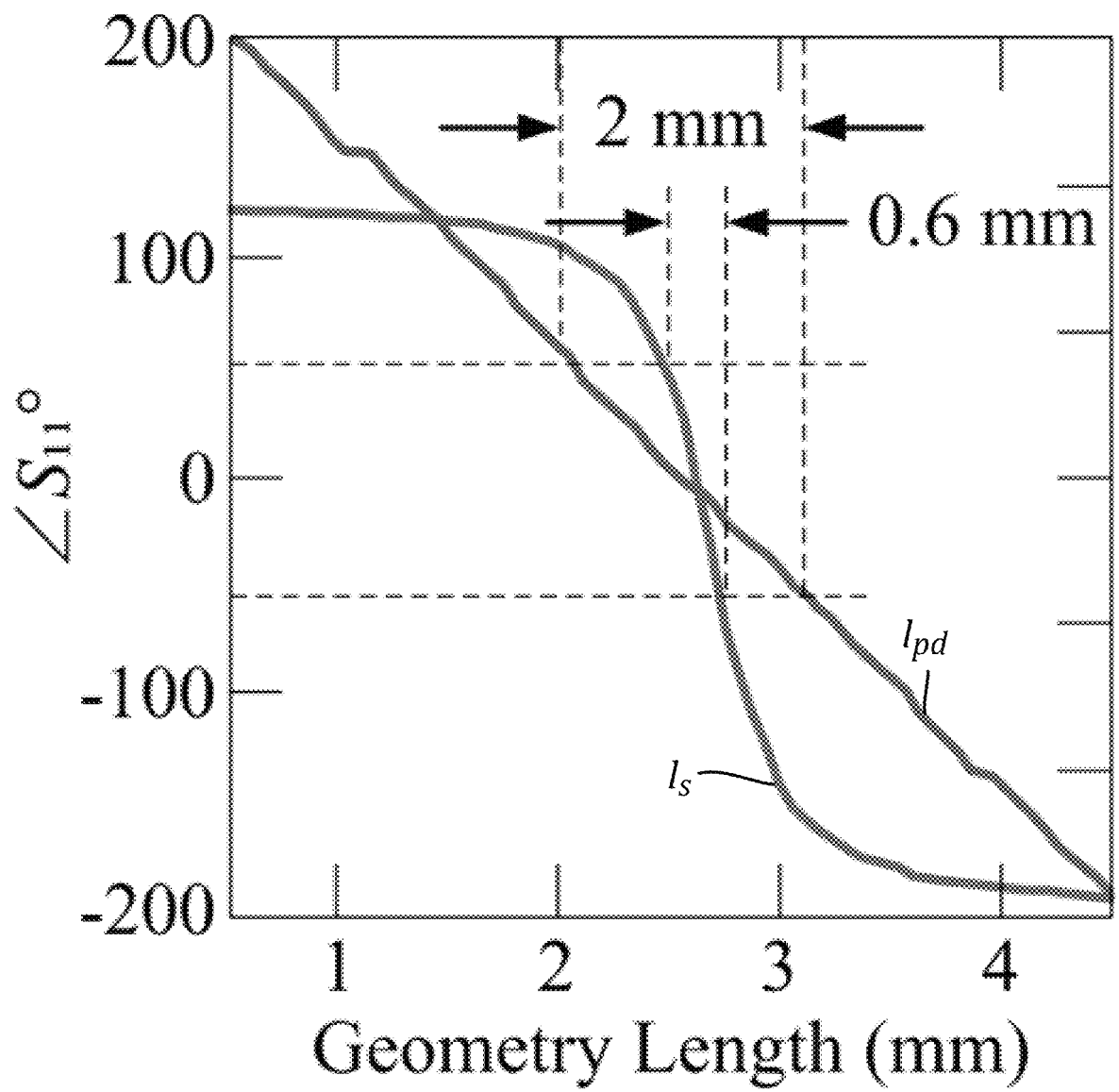
FIG. 9 is a graphical representation of geometry length versus signal reflection angle data for example passive metasurface device designs, in accordance with various example embodiments and implementations of the subject disclosure.

More particularly, FIGS. 8 and 9 highlight how the patch size variation approach designs 779 (without delay lines) suffer from phase errors, due to a combined effect of fabrication tolerance and the rapid phase variation near resonance. As shown in FIG. 9, the phase undergoes a 100 degree change within a mere 0.6 mm range. With typical fabrication tolerances between 0.07 to 0.20 mm (3-7 mil), this design is prone to phase errors, particularly at higher frequencies and/or when using cost-effective, lower precision manufacturing techniques. In contrast, the phase delay element designs 778 (FIG. 7B) with delay lines exhibit a flatter amplitude profile and a linear phase trend, as also shown in FIGS. 8 and 9, respectively. The phase shift with the phase delay element design approach 778 is proportional to twice the line length, offering significantly more reliable and consistent performance.

The phase delay element implementation design is appropriate for high frequency operation in that the design reduces the physical size and minimizes interference. More particularly, a metasurface design uses the phase delay element for tuning reflected signals' phase for high frequency operation, which enhances device compactness, aesthetic integration, and reduces interference by avoiding crowded spectral bands. At the same time, the design facilitates straightforward fabrication with the metallic patch element and phase delay element with a conformal design for versatile integration. Designing the length of the phase delay element for tuning not only eases the manufacturing process, but also significantly enhances the fabrication tolerances, which can significantly reduce barriers to innovation and deployment. The metasurface design's conformal nature is beneficial in wearable technology.

A wearable device can have information encoded into its reflected signal based on how the reflected signal is altered by the metasurface relative to the transmitted signal. More particularly, any device can be crafted with a distinct metasurface pattern that distinguishes that metasurface from others. The distinct identifiability of each device is based on its physical radiation characteristics, in that each metasurface can generate a distinct radiation pattern in the reflected signal, which differentiates each such metasurface while ensuring that each metasurface can uniquely interact with the corresponding system.

Figure 10A:
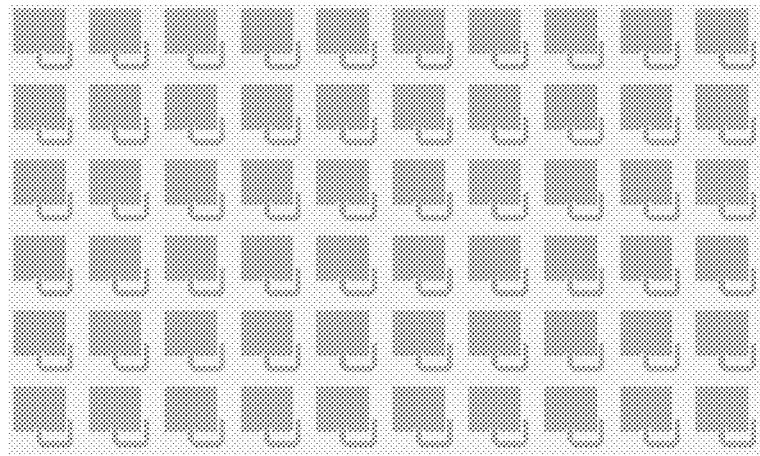
FIGS. 10A-10C are representations of example metasurfaces with various different design parameters to create distinct per device signatures, in accordance with various example embodiments and implementations of the subject disclosure.
Figure 10B:
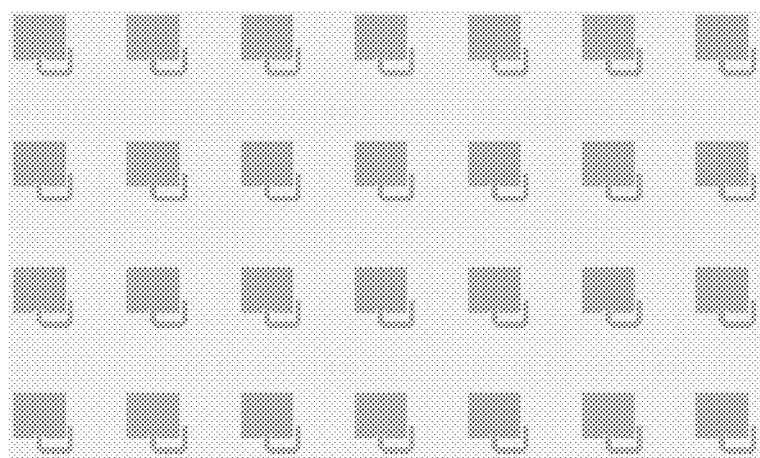
Figure 10C:
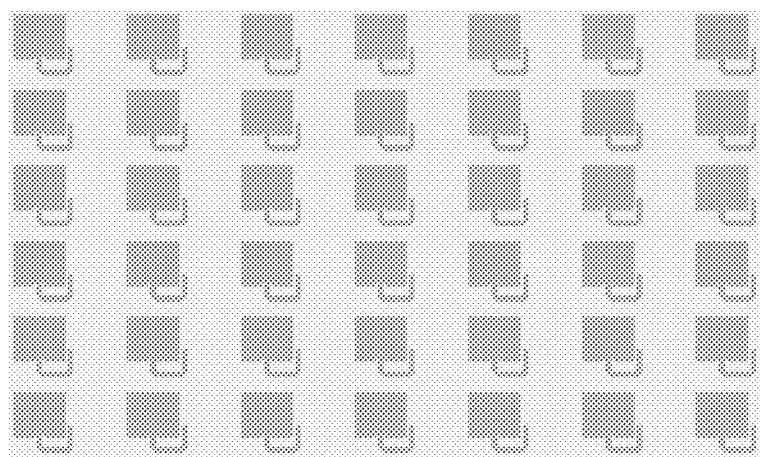

To this end, each device can be manufactured with a system-unique set of metasurface scatters (or simply unit-cells) to provide variations in terms of phase, gain, beam patterns, dual beam splitting, directivity, and the like which can be achieved by altering the unit-cell shape, phase, size, spacing, rotation, among other characteristics, as shown in FIGS. 10A-10C; the characteristics can be unique and randomized/or altered according to a controlled pseudorandom pattern. For example, the example metasurface of FIG. 10A can be considered a standard metasurface, while the more spaced-apart unit cells of FIG. 10B (relative to FIG. 10A) can provide a variation on the beam width. The horizontal spacing and vertical spacing differences in FIG. 10C can result in asymmetric beam splitting based on grating lobes (resulting in variations on the number of reflected beams and their angles).

An advantageous characteristic of the wearable technology described herein is the scalable design of the metasurface, which can be adapted to fit various sizes and types of wearables. The flexibility to customize the size of the metasurface based on the surface area of the wearable item enables a tailored approach to meet specific user needs. Further, as described with reference to FIGS. 10A-10C, there can be a distinct per-device performance signature, possibly globally unique, by which each device is manufactured with a different set of metasurface scatters (i.e., unit-cells) to provide variations in terms of phase, gain, beam patterns, multiple (e.g., dual) beam splitting, directivity and the like, which can be achieved by altering the unit-cell shape, phase, size, spacing, rotation and so forth.

This distinct performance signature can be linked to a system-unique device ID, in which the system expects to detect the predetermined performance signature when the wearable device is linked to the user's computing device and/or associated account. For example, the wearable device-related logic 116 (FIG. 1A) or 117 (FIG. 1B) can look for an expected radiation pattern and match it to a user account; if not matched, or no signal is reflected, metasurface-based access is denied, although another way to access the account may be enabled, such as if the user has forgotten to wear the device. There also can be shared access to a computing device, and thus the logic can map one radiation pattern signature to one authorized user of that computing device and to that user's profile/account, and map a different radiation pattern signature to another authorized user of that computing device and to that other user's profile/account.

Among the benefits of distinct metasurfaces and their corresponding distinct physical radiation patterns is with respect to integrated physical device identification for remote management of wearable metasurfaces. A concern regarding the security of a system as described herein is to ensure that only a specific, authorized wearable device can unlock the system/account, rather than just any wearable device. To address this, each device can be crafted with a different metasurface pattern that distinguishes it from others.

The distinct identifiability via customized radiation characteristics also facilitates the association of a service tag encoding for individual metasurface identification. By way of example, consider that the customized radiation characteristics can encode/correspond to a number of (e.g., seven) alphanumeric characters, that encode the specific differences in each metasurface's design, such as appearance, materials, location, antenna patterns, beam splitting nature, range, and so forth. Individual performance parameters can be encoded as well. An example metasurface with an associated service tag that is also encoded in the customized radiation characteristics is shown in FIG. 12A.

This customization involves distinct radiation patterns generated by each metasurface, tailored specifically to each device ID. This device ID can be incorporated or encrypted within an enterprise's service tag mechanism. For example, because peripherals do not need a separate service tag, a device ID in case of a wearable device is desirable to distinguish the physical features, internal metasurface design patterns, beam patterns, materials, location, and in general for remote management, including activation of the device when purchasing or deactivation in case if the device gets lost.

With respect to improved security and privacy, leveraging the distinct signal manipulation capabilities of metasurfaces, the technology described herein offers an advanced level of security. The complexity and customization potential of the reflected signals make it extremely challenging for unauthorized entities to mimic or hack. Indeed, the different characteristics of each ring or wearable device, achieved through specific customization of the radiation characteristics, can include the beam width (angular scan range) and the asymmetric beam splitting, which varies according to the number of beams and their specific angles. This ensures that each ring interacts individually with the system, providing a secure and personalized method of access.

Figure 11A:
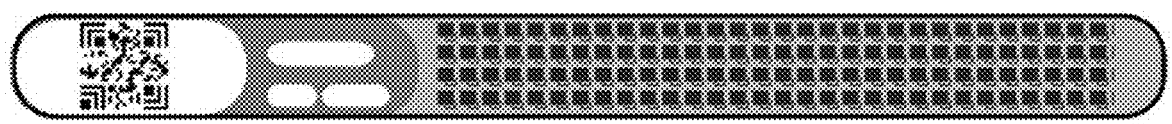
FIG. 11A is a representation of an example wearable device in which a distinct device physical radiation pattern signature is included in a device service tag, in accordance with various example embodiments and implementations of the subject disclosure.
Figure 11B:
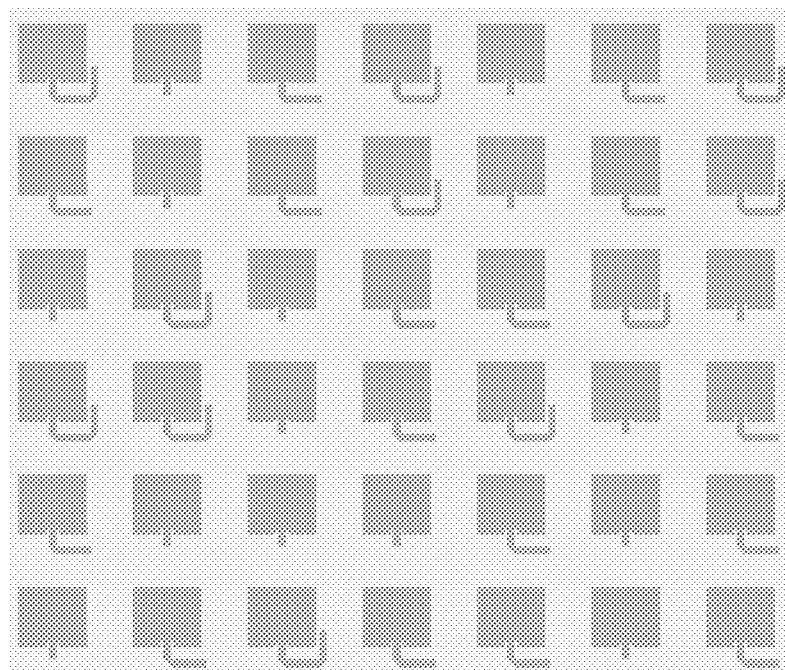
FIG. 11B is a representation of example unit cell designs with different length delay lines (stubs) arrayed for a distinct phase profile, in accordance with various example embodiments and implementations of the subject disclosure.
Figure 11C:
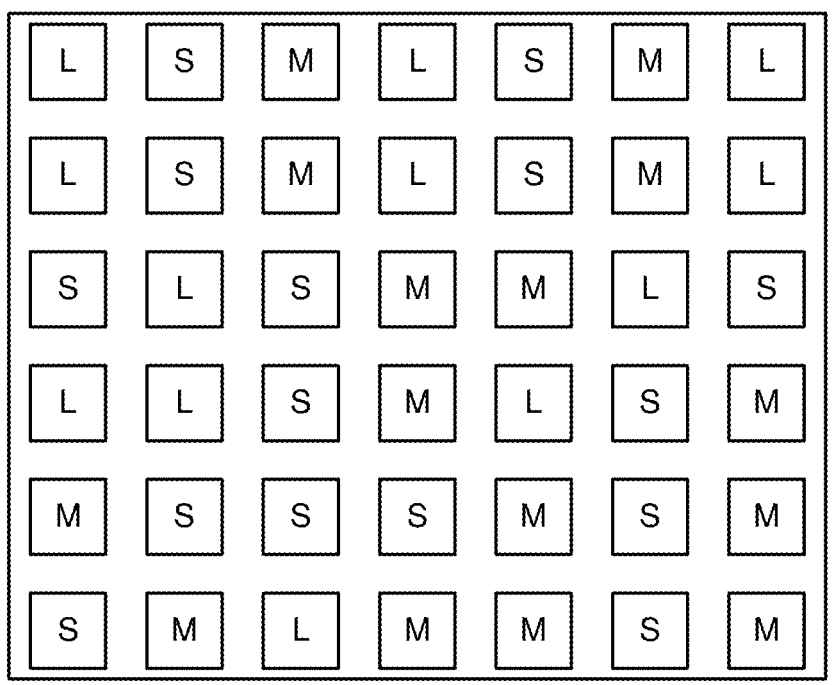
FIG. 11C is a representation of a map of the example unit cell designs with different length delay lines of FIG. 11A, in accordance with various example embodiments and implementations of the subject disclosure.

As a further example, in addition to the spacing differences described with reference to FIGS. 10A-10C, consider the different patterns of unit cell delay line (stub) lengths shown in FIG. 11B. FIG. 11C shows a map of the lengths, e.g., S (short), M (medium) and L (long) which can be distinctly arranged per metasurface. The pattern of the length arrangements of FIG. 11B, which results in one particular phase profile, can be varied for another device, and so on, providing another variable characteristic that modifies the physical radiation pattern of the reflected signal relative to the transmitted signal. Note that while three different delay line lengths are depicted, there can be more than three different lengths, providing even more variations in phase profiles among metasurfaces.

Figure 12:
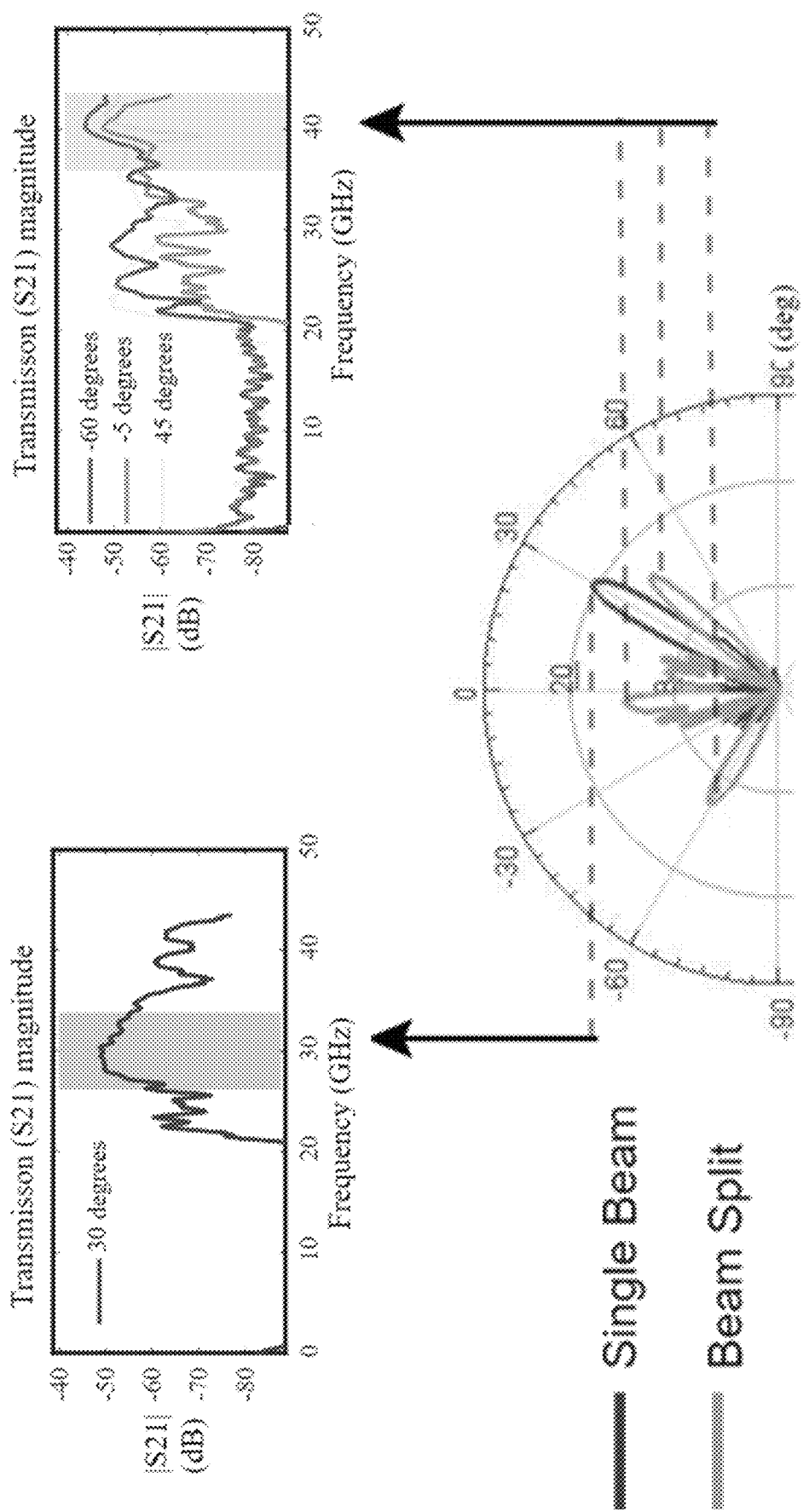
FIG. 12 is a graphical representation of different radiation patterns achieved from an example grating lobe-based beam-splitting metasurface, demonstrating the capability for a single reflected beam or a split beam from a wearable device with a passive metasurface, in accordance with various example embodiments and implementations of the subject disclosure.

FIG. 12 shows a different radiation pattern achieved from a metasurface configured for beam splitting. The frequency is tunable based on the metasurface unit cell size.

One or more example embodiments can be embodied in a device, such as described and represented herein. The device can include a wearable metasurface comprising respective passive unit cells with respective metallic elements. The metasurface can include a substrate beneath the respective metallic elements, and a segmented ground plane that can include separated metallic segments beneath the substrate. When the separated metallic segments of the segmented ground plane are electrically coupled to one another, the wearable metasurface reflects an incoming wireless radio frequency signal as a reflected altered instance of the incoming wireless radio frequency signal. When the separated metallic segments of the segmented ground plane are not electrically coupled to one another, the wearable metasurface does not reflect an altered instance of the incoming wireless radio frequency signal.

The separated metallic segments of the segmented ground plane can be electrically coupled to one another based on a skin conductivity of a user wearing the metasurface. When the user is wearing the metasurface, the reflected altered instance of the incoming wireless radio frequency signal can be received by a receiver to facilitate detection of a proximity of the user to the receiver. The device can be incorporated into a ring designed for wearing on a finger of the user. The device can be incorporated into a band designed for wearing on a wrist of the user.

The reflected altered instance of the incoming wireless radio frequency signal can include a physical radiation pattern that is distinct relative to other physical radiation patterns of other metasurfaces other than the metasurface.

The substrate comprises a flexible substrate physically coupled to the passive unit cells, and to the segmented ground plane.

The incoming wireless radio frequency signal is within a defined millimeter wave frequency band.

The incoming wireless radio frequency signal can be within a defined sub-terahertz wave frequency band.

One or more example embodiments can be embodied in a system, such as described and represented herein. The system can include a computing device coupled to a wireless radio frequency receiver and a wireless radio frequency transmitter, and a wearable metasurface that can include respective passive unit cells that, based on a skin conductivity of a user wearing the wearable metasurface causes a segmented ground plane of the wearable metasurface to act as a continuous ground plane, redirect transmitted wireless radio frequency signals, transmitted by the wireless radio frequency transmitter and impinging on at least part of the metasurface, as reflected wireless radio frequency signals for reception by the wireless radio frequency receiver. The respective passive unit cells can include respective elements that alter at least one property of the reflected wireless radio frequency signals relative to the transmitted wireless radio frequency signals to facilitate proximity detection, by the computing device, of the user wearing the wearable metasurface.

The wearable metasurface does not redirect the transmitted wireless radio frequency signals when the segmented ground plane of the wearable metasurface does not act as the continuous ground plane.

The metasurface can include a flexible substrate physically coupled to the respective passive unit cells and physically coupled to the segmented ground plane, and wherein the wearable metasurface is curved as part of a wearable ring, or curved as part of a wearable wristband.

The respective passive unit cells can be configured with distinct physical characteristics of respective metallic elements that alter the at least one property of the reflected wireless radio frequency signals to redirect the reflected wireless radio frequency signals with a distinct physical radiation pattern relative to other physical radiation patterns of other metasurfaces.

The wireless radio frequency transmitter and the wireless radio frequency receiver can include a transceiver.

The transceiver can be incorporated into the computing device.

The transceiver can be incorporated into a computer peripheral coupled to the computing device.

One or more example aspects, such as corresponding to example operations of a method, or a system/a machine-readable medium having executable instructions that, when executed by a processor, facilitate performance of the operations, are represented in FIG. 13. Example operation 1302 represents detecting, by a system comprising at least one processor, a proximity of a user to a computing device that comprises or is coupled to a receiver, the detecting can include example operations 1304 and 1306. Example operation 1304 represents receiving a wireless radio frequency signal at the receiver. Example operation 1306 represents determining that received radiation pattern data representative of a received radiation pattern associated with the wireless radio frequency signal matches expected radiation pattern data representative of an expected radiation pattern associated with a wearable metasurface associated with the user, the wearable metasurface comprising a segmented ground plane of separated metallic segments, in which the wearable metasurface reflects a transmitted signal to the receiver based on the segmented ground plane being a completed ground plane as a result of a skin conductivity of the user wearing the wearable metasurface electrically coupling the separated metallic segments to one another. Example operation 1308 represents, in response to the determining that the received radiation pattern data matches the expected radiation pattern data, determining, by the system, that the user associated with the wearable metasurface is within a specified proximity distance of the computing device. Example operation 1310 represents taking action, by the system, based on the user associated with the wearable metasurface being determined to be within the specified proximity distance of the computing device.

Taking the action can include at least one of: activating a program on the computing device, or authenticating at least one user credential associated with the user with respect to the computing device.

The action can be a first action, and further operations can include determining, by the system, that the wearable metasurface is no longer detected as being within the specified proximity distance of the computing device, and, in response to the detecting that the user is no longer within the specified proximity distance of the computing device, taking a second action that is different from the first action.

Determining that the wearable metasurface is no longer detected as being within the specified proximity distance of the computing device can correspond to the user removing the wearable metasurface, resulting in the wearable metasurface no longer reflecting the transmitted signal to the receiver based on the separated metallic segments of the segmented ground plane becoming electrically decoupled from one another resulting from absence of the skin conductivity of the user.

As can be seen, described herein is an activatable and de-activatable wearable device with a metasurface designed with a distinct physical radiation pattern/signature that facilitates detection of the device when activated. Activation and deactivation are based on a segmented ground plane that is part of the metasurface design. When activated, e.g., when the device is worn by a user which completes the ground plane by coupling the separated segments together via skin conductivity, the wearable/portable devices can be detected, such as for proximity detection and/or seamless authentication on digital computing devices such as a laptop/desktop PC. When not worn, the device is deactivated as a result of the ground plane segments being electrically separated from one another. The technology described herein is thus implemented through a passive metasurface, to enhance personal security and facilitate seamless interaction with digital environments. Metasurfaces, being engineered interfaces, manipulate electromagnetic waves in ways that traditional materials cannot, without requiring any power source, making them very suitable for passive operations in wearable technology, as well as facilitating distinct radiation patterns per metasurface.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A device, comprising:
   a wearable metasurface comprising respective passive unit cells with respective metallic elements, the metasurface comprising a substrate beneath the respective metallic elements, and a segmented ground plane comprising separated metallic segments beneath the substrate,
   wherein, when the separated metallic segments of the segmented ground plane are electrically coupled to one another, the wearable metasurface reflects an incoming wireless radio frequency signal as a reflected altered instance of the incoming wireless radio frequency signal, and
   wherein, when the separated metallic segments of the segmented ground plane are not electrically coupled to one another, the wearable metasurface does not reflect an altered instance of the incoming wireless radio frequency signal.

2. The device of claim 1, wherein the separated metallic segments of the segmented ground plane are electrically coupled to one another based on a skin conductivity of a user wearing the metasurface.

3. The device of claim 2, wherein, when the user is wearing the metasurface, the reflected altered instance of the incoming wireless radio frequency signal is received by a receiver to facilitate detection of a proximity of the user to the receiver.

4. The device of claim 2, wherein the device is incorporated into a ring designed for wear on a finger of the user.

5. The device of claim 2, wherein the device is incorporated into a band designed for wear on a wrist of the user.

6. The device of claim 1, wherein the reflected altered instance of the incoming wireless radio frequency signal comprises a physical radiation pattern that is distinct relative to other physical radiation patterns of other metasurfaces other than the metasurface.

7. The device of claim 1, wherein the substrate comprises a flexible substrate physically coupled to the passive unit cells, and to the segmented ground plane.

8. The device of claim 1, wherein the incoming wireless radio frequency signal is within a defined millimeter wave frequency band.

9. The device of claim 1, wherein the incoming wireless radio frequency signal is within a defined sub-terahertz wave frequency band.

10. A system, comprising:
    a computing device coupled to a wireless radio frequency receiver and a wireless radio frequency transmitter; and
    a wearable metasurface comprising respective passive unit cells that, based on a skin conductivity of a user wearing the wearable metasurface that causes a segmented ground plane of the wearable metasurface to act as a continuous ground plane, redirect transmitted wireless radio frequency signals, transmitted by the wireless radio frequency transmitter and impinging on at least part of the metasurface, as reflected wireless radio frequency signals for reception by the wireless radio frequency receiver,
    wherein the respective passive unit cells comprise respective elements that alter at least one property of the reflected wireless radio frequency signals relative to the transmitted wireless radio frequency signals to facilitate proximity detection, by the computing device, of the user wearing the wearable metasurface.

11. The system of claim 10, wherein the wearable metasurface does not redirect the transmitted wireless radio frequency signals when the segmented ground plane of the wearable metasurface does not act as the continuous ground plane.

12. The system of claim 10, wherein the metasurface comprises a flexible substrate physically coupled to the respective passive unit cells and physically coupled to the segmented ground plane, and wherein the wearable metasurface is curved as part of a wearable ring, or curved as part of a wearable wristband.

13. The system of claim 10, wherein the respective passive unit cells are configured with distinct physical characteristics of respective metallic elements that alter the at least one property of the reflected wireless radio frequency signals to redirect the reflected wireless radio frequency signals with a distinct physical radiation pattern relative to other physical radiation patterns of other metasurfaces.

14. The system of claim 10, wherein the wireless radio frequency transmitter and the wireless radio frequency receiver comprise a transceiver.

15. The system of claim 14, wherein the transceiver is incorporated into the computing device.

16. The system of claim 14, wherein the transceiver is incorporated into a computer peripheral coupled to the computing device.

17. A method, comprising:
  detecting, by a system comprising at least one processor, a proximity of a user to a computing device that comprises or is coupled to a receiver, the detecting comprising:
    receiving a wireless radio frequency signal at the receiver, and
    determining that received radiation pattern data representative of a received radiation pattern associated with the wireless radio frequency signal matches expected radiation pattern data representative of an expected radiation pattern associated with a wearable metasurface associated with the user, the wearable metasurface comprising a segmented ground plane of separated metallic segments, wherein the wearable metasurface reflects a transmitted signal to the receiver based on the segmented ground plane being a completed ground plane as a result of a skin conductivity of the user wearing the wearable metasurface electrically coupling the separated metallic segments to one another;
  in response to the determining that the received radiation pattern data matches the expected radiation pattern data, determining, by the system, that the user associated with the wearable metasurface is within a specified proximity distance of the computing device; and
  taking action, by the system, based on the user associated with the wearable metasurface being determined to be within the specified proximity distance of the computing device.

18. The method of claim 17, wherein the taking of the action comprises at least one of: activating a program on the computing device, or authenticating at least one user credential associated with the user with respect to the computing device.

19. The method of claim 17, wherein the action is a first action, and further comprising determining, by the system, that the wearable metasurface is no longer detected as being within the specified proximity distance of the computing device, and, in response to the detecting that the user is no longer within the specified proximity distance of the computing device, taking a second action that is different from the first action.

20. The method of claim 19, wherein the determining that the wearable metasurface is no longer detected as being within the specified proximity distance of the computing device corresponds to the user removing the wearable metasurface, resulting in the wearable metasurface no longer reflecting the transmitted signal to the receiver based on the separated metallic segments of the segmented ground plane becoming electrically decoupled from one another resulting from absence of the skin conductivity of the user.

* * * * *